US009195238B2

(12) United States Patent
Roden et al.

(10) Patent No.: US 9,195,238 B2
(45) Date of Patent: Nov. 24, 2015

(54) WASTE WATER VESSELS WITH MULTIPLE VALVED CHAMBERS, AND ASSOCIATED SYSTEMS AND METHODS

(71) Applicant: Sapphire Scientific Inc., Prescott, AZ (US)

(72) Inventors: Michael James Roden, Prescott, AZ (US); Bill Elmer Richardson, Prescott Valley, AZ (US)

(73) Assignee: Sapphire Scientific, Inc., Prescott, AZ (US)

( * ) Notice: Subject to any disclaimer, the term of this patent is extended or adjusted under 35 U.S.C. 154(b) by 284 days.

(21) Appl. No.: 13/830,569

(22) Filed: Mar. 14, 2013

(65) Prior Publication Data

US 2013/0333760 A1    Dec. 19, 2013

Related U.S. Application Data

(60) Provisional application No. 61/660,618, filed on Jun. 15, 2012.

(51) Int. Cl.
*E01H 1/08* (2006.01)
*G05D 9/00* (2006.01)
(Continued)

(52) U.S. Cl.
CPC ... *G05D 9/00* (2013.01); *A47L 9/28* (2013.01); *A47L 11/30* (2013.01); *B08B 3/00* (2013.01);
(Continued)

(58) Field of Classification Search
CPC .............. G05D 9/00; G05D 9/12; C02F 1/00; A47L 11/30; A47L 9/28; E01H 1/08; E03F 1/006; B08B 3/00; Y10T 137/86196; Y10T 137/8622; Y10T 137/86228

USPC ............ 137/312, 572, 575, 576; 15/320, 347, 15/535

See application file for complete search history.

(56) References Cited

U.S. PATENT DOCUMENTS

| 855,433 A | 5/1907 | Freeman |
|---|---|---|
| 896,290 A | 8/1908 | Freeman |

(Continued)

FOREIGN PATENT DOCUMENTS

| AU | 656114 B3 | 1/1995 |
|---|---|---|
| AU | 664947 B2 | 12/1995 |

(Continued)

OTHER PUBLICATIONS

"TMF Review: Flash Xtractor by Waterclaw," http://www.youtube.com/watch?v=ts0xmTmBFsY, uploaded Jul. 2, 2010, 1 page.

(Continued)

*Primary Examiner* — Craig Schneider
*Assistant Examiner* — Josephine Trinidad-Borges
(74) *Attorney, Agent, or Firm* — Perkins Coie LLP

(57) ABSTRACT

The present disclosure is directed generally to waste water vessels with multiple valved chambers, and associated systems and methods. A method in accordance with a particular embodiment includes drawing waste water into a first chamber under vacuum while the first chamber and a second chamber have at least approximately the same internal pressure. The method further includes allowing the waste water to pass from the first chamber to the second chamber while the first chamber and a second chamber have at least approximately the same internal pressure, releasably sealing the first chamber from fluid communication with the second chamber, and simultaneously adding waste water to the first chamber and removing wastewater from the second chamber while the first chamber is sealed from fluid communication with the second chamber.

29 Claims, 4 Drawing Sheets

(51) Int. Cl.

| | | |
|---|---|---|
| *G05D 9/12* | (2006.01) | |
| *C02F 1/00* | (2006.01) | |
| *A47L 11/30* | (2006.01) | |
| *A47L 9/28* | (2006.01) | |
| *E03F 1/00* | (2006.01) | |
| *B08B 3/00* | (2006.01) | |

(52) U.S. Cl.
 CPC .. *C02F 1/00* (2013.01); *E01H 1/08* (2013.01);
 *E03F 1/006* (2013.01); *G05D 9/12* (2013.01);
 *Y10T 137/0318* (2015.04); *Y10T 137/7287*
 (2015.04); *Y10T 137/8622* (2015.04); *Y10T
 137/86035* (2015.04); *Y10T 137/86196*
 (2015.04); *Y10T 137/86228* (2015.04)

(56) References Cited

U.S. PATENT DOCUMENTS

| | | | |
|---|---|---|---|
| 930,134 | A | 8/1909 | Blackall |
| 933,003 | A | 8/1909 | Smith |
| 1,016,435 | A | 2/1912 | Overholt |
| 1,042,711 | A | 10/1912 | Moorhead |
| 1,601,774 | A | 10/1926 | Scheffer |
| 1,661,553 | A | 3/1928 | Baar |
| 1,703,551 | A | 2/1929 | Singer |
| 1,787,916 | A * | 1/1931 | Evans et al. ............... 137/625.41 |
| 1,821,715 | A | 9/1931 | Kuchinsky |
| 1,929,345 | A | 10/1933 | Brown et al. |
| 1,992,238 | A | 2/1935 | Rose |
| 2,081,597 | A | 5/1937 | Nowak |
| 2,156,890 | A | 5/1939 | Wuringer |
| 2,164,392 | A | 7/1939 | Ellis |
| 2,210,030 | A | 8/1940 | Ellis |
| 2,219,802 | A | 10/1940 | Bjorkman |
| 2,240,005 | A | 4/1941 | Moyer |
| 2,276,944 | A | 3/1942 | Dow |
| 2,280,751 | A | 4/1942 | Davis |
| 2,533,697 | A | 12/1950 | Stewart |
| 2,554,238 | A | 5/1951 | Burrl |
| 2,624,063 | A | 1/1953 | Van Der Heem |
| 2,703,905 | A | 3/1955 | Faith-Ell |
| 2,719,596 | A | 10/1955 | Kent et al. |
| 2,785,432 | A | 3/1957 | Rockwell |
| 2,799,040 | A | 7/1957 | Hageal |
| 2,822,061 | A | 2/1958 | Pettit et al. |
| 3,029,463 | A | 4/1962 | Bishop |
| 3,065,491 | A | 11/1962 | Amador |
| 3,072,951 | A | 1/1963 | Kelnhofer |
| 3,134,128 | A | 5/1964 | Campbell |
| 3,169,843 | A | 2/1965 | Campbell |
| 3,286,368 | A | 11/1966 | Thomas |
| 3,324,846 | A | 6/1967 | Smith |
| 3,345,672 | A | 10/1967 | La Mers et al. |
| 3,375,540 | A | 4/1968 | Hyde |
| 3,506,747 | A | 4/1970 | Creskoff |
| 3,571,841 | A | 3/1971 | Crouser |
| 3,594,849 | A | 7/1971 | Coshow |
| 3,605,171 | A | 9/1971 | Candor et al. |
| 3,619,848 | A | 11/1971 | Salzmann |
| 3,624,668 | A | 11/1971 | Krause |
| 3,689,956 | A | 9/1972 | Melreit |
| 3,697,771 | A | 10/1972 | Colt |
| 3,701,343 | A | 10/1972 | Bowers |
| 3,708,824 | A | 1/1973 | Holubinka |
| 3,739,422 | A | 6/1973 | Johnson et al. |
| 3,739,483 | A | 6/1973 | Meier-Windhorst |
| 3,761,997 | A | 10/1973 | Frazier |
| 3,771,193 | A | 11/1973 | Hageal |
| 3,774,261 | A | 11/1973 | Colt |
| 3,780,398 | A | 12/1973 | Candor |
| 3,786,531 | A | 1/1974 | Borg |
| 3,800,359 | A | 4/1974 | Howard et al. |
| 3,895,407 | A | 7/1975 | Parise |
| 3,919,729 | A | 11/1975 | Cannan |
| 3,950,815 | A | 4/1976 | Fukuchi et al. |
| 3,958,298 | A | 5/1976 | Cannan |
| 3,964,925 | A | 6/1976 | Burgoon |
| 4,000,538 | A | 1/1977 | Tissier |
| 4,013,039 | A | 3/1977 | Kubilius et al. |
| 4,074,387 | A | 2/1978 | Arato et al. |
| 4,095,309 | A | 6/1978 | Sundheim |
| D248,763 | S | 8/1978 | Muller |
| 4,109,340 | A | 8/1978 | Bates |
| 4,133,072 | A | 1/1979 | Face, Jr. |
| 4,153,968 | A | 5/1979 | Perkins |
| 4,161,802 | A | 7/1979 | Knight et al. |
| 4,182,001 | A | 1/1980 | Krause |
| 4,203,714 | A | 5/1980 | Wenander |
| 4,207,649 | A | 6/1980 | Bates |
| 4,227,316 | A | 10/1980 | Schneider |
| 4,264,999 | A | 5/1981 | Monson |
| 4,270,238 | A | 6/1981 | Shallenberg et al. |
| 4,275,478 | A | 6/1981 | Kohlenberger |
| 4,279,057 | A | 7/1981 | Restivo |
| 4,284,127 | A | 8/1981 | Collier et al. |
| 4,308,636 | A | 1/1982 | Davis |
| 4,334,336 | A | 6/1982 | Harbeck et al. |
| 4,335,486 | A | 6/1982 | Kochte |
| 4,336,627 | A | 6/1982 | Bascus |
| 4,339,840 | A | 7/1982 | Monson |
| 4,373,226 | A | 2/1983 | Lubnitz |
| 4,391,017 | A | 7/1983 | Bruensicke |
| 4,391,619 | A | 7/1983 | Shono et al. |
| 4,413,372 | A | 11/1983 | Berfield |
| 4,441,229 | A | 4/1984 | Monson |
| 4,443,909 | A | 4/1984 | Cameron |
| 4,475,264 | A | 10/1984 | Schulz |
| 4,475,265 | A | 10/1984 | Berfield |
| 4,488,329 | A | 12/1984 | Lackenbach |
| 4,531,928 | A | 7/1985 | Ikenoya |
| 4,571,849 | A | 2/1986 | Gardner et al. |
| 4,584,736 | A | 4/1986 | Gremminger |
| 4,675,935 | A | 6/1987 | Kasper et al. |
| 4,677,705 | A | 7/1987 | Schuster |
| 4,692,959 | A | 9/1987 | Monson |
| D295,092 | S | 4/1988 | Mizuno et al. |
| 4,759,155 | A | 7/1988 | Shaw |
| 4,862,551 | A | 9/1989 | Martinez et al. |
| 4,875,249 | A | 10/1989 | Collier |
| 4,879,784 | A | 11/1989 | Shero |
| D306,788 | S | 3/1990 | McAllister et al. |
| 4,922,572 | A | 5/1990 | Kohl et al. |
| 4,968,166 | A | 11/1990 | Ingram |
| 4,989,294 | A | 2/1991 | Fischer |
| 5,014,389 | A | 5/1991 | Ogilvie et al. |
| 5,032,184 | A | 7/1991 | Ogilvie et al. |
| 5,067,199 | A | 11/1991 | Alazet |
| 5,103,527 | A | 4/1992 | Holland |
| 5,134,748 | A | 8/1992 | Lynn |
| 5,280,666 | A | 1/1994 | Wood et al. |
| D345,234 | S | 3/1994 | Iorli |
| 5,392,490 | A | 2/1995 | Monson |
| D361,178 | S | 8/1995 | Piret |
| 5,437,651 | A | 8/1995 | Todd et al. |
| 5,463,791 | A | 11/1995 | Roden |
| 5,485,651 | A | 1/1996 | Payeur |
| 5,485,652 | A | 1/1996 | Holland |
| 5,548,905 | A | 8/1996 | Kuma et al. |
| 5,555,595 | A | 9/1996 | Ligman |
| 5,593,091 | A | 1/1997 | Harris |
| 5,634,238 | A | 6/1997 | McCaffrey et al. |
| D381,144 | S | 7/1997 | Moine et al. |
| 5,655,255 | A | 8/1997 | Kelly |
| 5,655,258 | A | 8/1997 | Heintz |
| 5,659,923 | A | 8/1997 | Coombs |
| 5,720,078 | A | 2/1998 | Heintz |
| 5,778,646 | A | 7/1998 | Pfisterer |
| 5,797,161 | A | 8/1998 | Campbell |
| 5,819,366 | A | 10/1998 | Edin |
| 5,870,797 | A | 2/1999 | Anderson |
| 5,891,198 | A | 4/1999 | Pearlstein |
| 5,911,260 | A | 6/1999 | Suzuki |
| 5,927,557 | A * | 7/1999 | Busick et al. ............... 222/185.1 |
| 5,992,051 | A | 11/1999 | Salehibakhsh |

(56) References Cited

U.S. PATENT DOCUMENTS

| | | |
|---|---|---|
| 6,029,310 A | 2/2000 | Besel |
| 6,047,437 A | 4/2000 | Suzuki |
| 6,052,861 A | 4/2000 | Keller |
| D424,766 S | 5/2000 | Martin |
| 6,076,597 A | 6/2000 | Manning et al. |
| 6,080,243 A | 6/2000 | Insley et al. |
| 6,101,667 A | 8/2000 | Ishikawa |
| 6,136,098 A | 10/2000 | Tribastone |
| 6,152,151 A | 11/2000 | Bolden et al. |
| 6,182,328 B1 | 2/2001 | Roden |
| 6,195,907 B1 | 3/2001 | Bodnar et al. |
| 6,243,914 B1 | 6/2001 | Studebaker |
| 6,266,892 B1 | 7/2001 | Haynie |
| 6,290,097 B1 | 9/2001 | Oakley |
| 6,298,577 B1 | 10/2001 | Haynie |
| 6,355,112 B1 | 3/2002 | Bartholmey et al. |
| 6,421,875 B1 | 7/2002 | Coombs et al. |
| D468,499 S | 1/2003 | Kitts |
| 6,513,192 B1 | 2/2003 | Pearlstein |
| D479,636 S | 9/2003 | Kitts |
| 6,647,639 B1 | 11/2003 | Storrer |
| 6,675,437 B1 | 1/2004 | York |
| 6,981,338 B2 | 1/2006 | Jensen et al. |
| D518,259 S | 3/2006 | Wertz |
| D520,202 S | 5/2006 | Dyson et al. |
| D522,197 S | 5/2006 | Dyson et al. |
| 7,059,013 B2 | 6/2006 | Wydra et al. |
| 7,070,662 B2 | 7/2006 | Studebaker |
| 7,159,271 B2 | 1/2007 | Sepke et al. |
| D538,986 S | 3/2007 | Ingram |
| D565,262 S | 3/2008 | Dyson et al. |
| 7,392,566 B2 | 7/2008 | Gordon et al. |
| 7,469,727 B2 * | 12/2008 | Marshall .................. 141/65 |
| 7,841,042 B2 | 11/2010 | Roden et al. |
| 7,870,639 B2 | 1/2011 | Thomas |
| D635,315 S | 3/2011 | Wertz |
| D643,169 S | 8/2011 | Calvert |
| 8,032,979 B2 | 10/2011 | Boone |
| D663,909 S | 7/2012 | Andreesen |
| D701,661 S | 3/2014 | Bruders et al. |
| 2002/0042965 A1 | 4/2002 | Salem et al. |
| 2002/0148066 A1 | 10/2002 | Bullis |
| 2002/0184729 A1 | 12/2002 | Farina |
| 2004/0255484 A1 | 12/2004 | Storrer et al. |
| 2006/0196074 A1 | 9/2006 | Vilhunen |
| 2006/0207053 A1 | 9/2006 | Beynon |
| 2006/0282975 A1 | 12/2006 | Basham et al. |
| 2007/0039724 A1 | 2/2007 | Trumbower et al. |
| 2007/0061996 A1 | 3/2007 | Boone |
| 2007/0079472 A1 | 4/2007 | Carter et al. |
| 2008/0184520 A1 | 8/2008 | Wolfe et al. |
| 2008/0263812 A1 | 10/2008 | Williams et al. |
| 2009/0038105 A1 | 2/2009 | Mayer |
| 2009/0094784 A1 | 4/2009 | Pedlar et al. |
| 2009/0288685 A1 | 11/2009 | Wolfe et al. |
| 2010/0206344 A1 | 8/2010 | Studebaker |
| 2010/0223750 A1 | 9/2010 | Kappos et al. |
| 2010/0269932 A1 * | 10/2010 | Richmond .................. 137/613 |

FOREIGN PATENT DOCUMENTS

| | | |
|---|---|---|
| AU | 736546 B2 | 8/2001 |
| CA | 02559485 A1 | 9/2005 |
| CA | 02568203 A1 | 12/2005 |
| GB | 2145620 A | 4/1985 |
| GB | 663211 A | 1/2003 |
| WO | WO-0106188 A1 | 1/2001 |
| WO | WO-2005118959 A1 | 12/2005 |

OTHER PUBLICATIONS

"Water Claw debuts the FLASHXtractor," i Cleaning Specialist, http://www.icsmag.com/articles/print/water-claw-debuts-the-flashxtractor, Mar. 8, 2010, 1 page.

Definition of Fluid, Hyperdictionary, http://www.hyperdictionary.com/search.aspx?define=Fluid, accessed Aug. 11, 2011, 3 pages.

Dri-Eaz, "Rescue Mat System," <http://www.dri-eaz.com/VTC/RescueMat.html>, internet accessed on Jun. 20, 2005, 7 pages.

Injectidry Systems, Inc., "Product Page," <http://web.archive.org/web/20000520132110/www.injectidry.com/product.htm>, internet accessed on May 20, 2005, 3 pages.

Injectidry Systems, Inc., "Vac-It Panels," <http://web.archive.org/web/20021222211319/www.injectidry.com/vpanel.htm>, internet accessed on Jun. 20, 2005, 2 pages.

International Search Report and Written Opinion for International Patent Application No. PCT/US2013/045947, Applicant: Sapphire Scientific Inc., mailed Oct. 18, 2013, 9 pages.

JonDon, "DryPro Water Vac", <http://www.jondon.com>, internet accessed on Apr. 2, 2010, 2 pages.

U.S. Products, "The Flood King—Portable Water Extractor for Restoration," Instant 212° F Heat at the Wand Tip, http://www.usproducts.com/products/restoration/floodking.htm, accessed Aug. 17, 2011, 1 page.

* cited by examiner

WASTE WATER VESSELS WITH MULTIPLE VALVED CHAMBERS, AND ASSOCIATED SYSTEMS AND METHODS

CROSS-REFERENCE TO RELATED APPLICATION

The present application claims priority to U.S. Provisional Patent Application 61/660,618, filed on Jun. 15, 2012 and incorporated herein by reference. To the extent the foregoing application and/or any other materials conflict with the present disclosure, the present disclosure controls.

TECHNICAL FIELD

The present disclosure is directed generally to waste water vessels with multiple valved chambers, and associated systems and methods.

BACKGROUND

Existing commercial systems for cleaning flooring surfaces and/or extracting water from water-damaged buildings include truck, van or trailer based devices. These devices typically include a supply water tank that supplies clean, (optionally) heated water and detergent to a hand held wand. An operator moves the wand over the floor while the wand directs the heated cleaning fluid over the floor and removes spent cleaning fluid and dirt from the floor. Such systems typically include a waste tank that receives the post-cleaning fluid and dirt extracted by the wand. A pump pressurizes the water supplied to the wand, and a blower draws a vacuum on the waste tank so as to draw the waste water and dirt from the wand into the waste tank. The pump and blower can be driven by the vehicle's engine, or, more typically, with a separate internal combustion engine carried by the vehicle.

DETAILED DESCRIPTION

Figure 1:
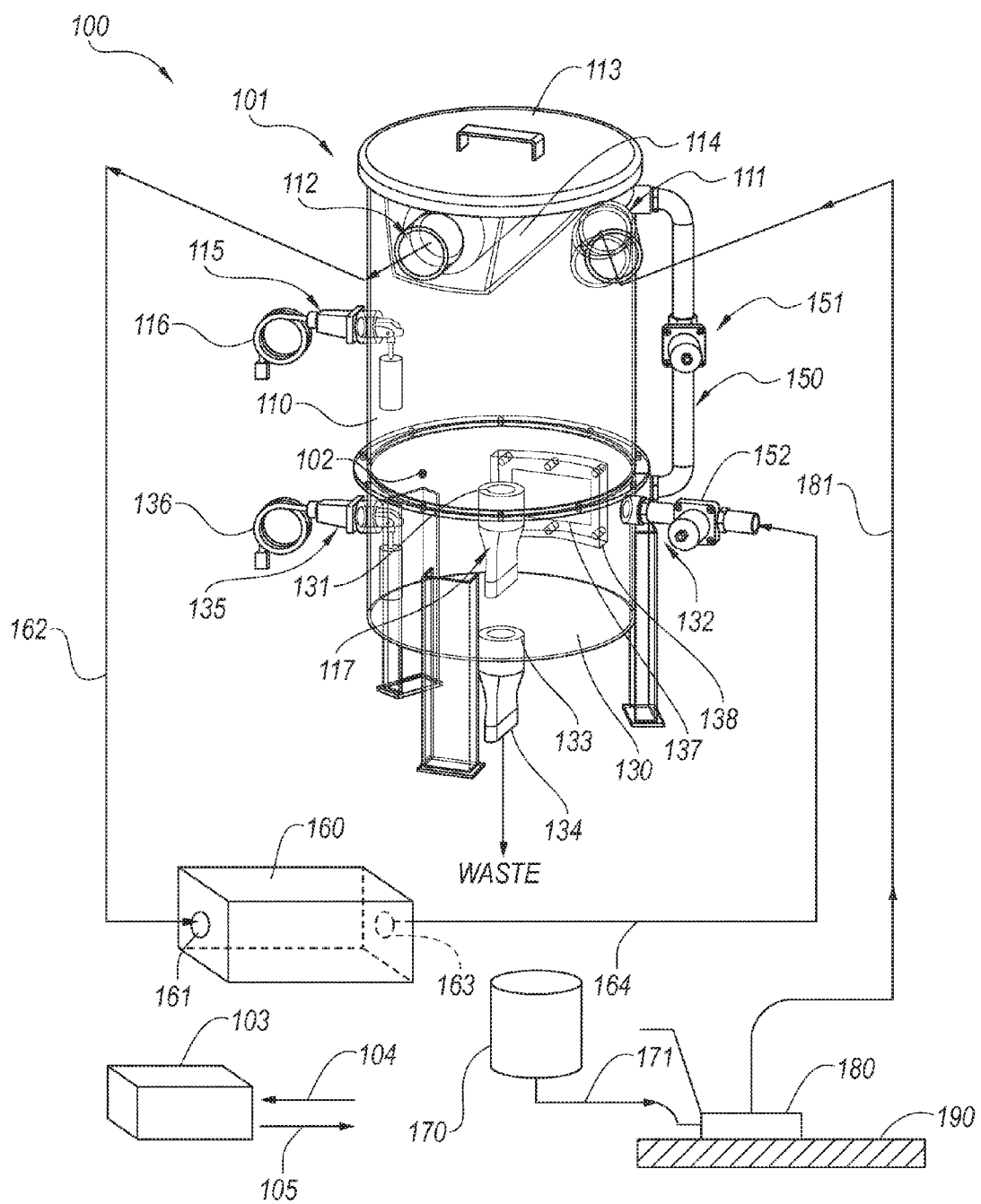
FIG. 1 is a partially transparent, isometric illustration of a system for handling waste water in accordance with an embodiment of the present technology.

The present technology is directed generally to waste water vessels with multiple valved chambers, and associated systems and methods. Specific details of several embodiments of the disclosure are described below with reference to particular configurations. In other embodiments, aspects of the disclosed technology can have other arrangements. Several details disclosing structures or processes that are well-known and often associated with these types of systems, but that may unnecessarily obscure some significant aspects of the disclosure, are not set forth in the following description for purposes of clarity. Moreover, although the following disclosure sets forth several embodiments of different aspects of the disclosed technology, several other embodiments can have different configurations and/or different components than those described in this section. Accordingly, the present technology may have other embodiments with additional elements not described below with reference to FIGS. 1-4, and/or without several of the elements described below with reference to FIGS. 1-4.

One drawback associated with the conventional waste water tanks described previously is that the user is typically not able to operate such tanks in a continuous manner. In particular, the user typically fills the tank with waste water until the tank reaches capacity and must then empty the tank. As the tank is being emptied, the user cannot simultaneously add waste water to it. Accordingly, the operator must repeatedly alternate between filling the waste water tank (e.g., with a wand during a cleaning and/or water removal operation) and empting the waste water tank. Alternatively, some systems include a large pump that continuously or intermittently pumps against the vacuum in the waste water tank to empty it. Such pumps are typically expensive and require extensive maintenance. These and other drawbacks associated with conventional systems are addressed by embodiments of the presently disclosed technology, as described further below.

Particular embodiments of the present technology described below may take the form of computer-executable instructions, including routines executed by a programmable computer or controller. Those skilled in the relevant art will appreciate that the technology can be practiced on computer systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the certain embodiments of the technology, while other embodiments do not include data structures and transmissions of data.

FIG. 1 is a partially schematic, partially transparent illustration of a system 100 having a vessel 101 configured in accordance with a particular embodiment of the present technology. The system 100 also includes a floor tool 180 (e.g., a wand) that moves along a floor or other surface 190 and removes liquid, e.g., water. The water can be pre-existing water (e.g., floodwater) and/or cleaning water provided by a water supply 170 via a clean water line 171. The vessel 101 includes a first or upper chamber 110 and a second or lower chamber 130. The first chamber 110 receives waste fluid via a waste intake port 111 that is coupled to the floor tool 180 with a waste water line 181. The second chamber 130 delivers the collected waste fluid through an exit port 133 and a second chamber outlet valve 134, e.g., to a drain line, large storage tank, or final disposal site. As will be described in greater detail below, the first and second chambers 110, 130 are coupled together so as to operate simultaneously. Accordingly, the vessel 101 can be drained via the second chamber outlet valve 134 at the same time it receives waste fluid via the waste intake port 111.

In addition to the waste intake port 111, the first chamber 110 includes a vacuum outlet port 112. The vacuum outlet port 112 can be coupled to a vacuum source 160 having a vacuum inlet 161. Accordingly, the vacuum source 160 can draw a vacuum on the interior region of the first chamber 110 via a vacuum line 162. The vacuum created by the vacuum source 160 on the interior region of the first chamber 110 in turn draws waste fluid through the waste intake port 111. Waste water entering the waste intake port 111 can be directed in a circumferential, downward direction, so as to swirl or otherwise circulate on its way downwardly through the first chamber 110. One or more baffles 114 prevent or at least restrict the liquid entering the waste intake port 111 from being sucked into the vacuum outlet port 112. Accordingly, this arrangement allows air to be withdrawn through the vacuum outlet port 112 without also entraining liquids and/or solids entering the waste intake port 111.

A chamber divider 102 can be positioned between the first chamber 110 and the second chamber 130. Accordingly, the chamber divider can include a single wall (as shown in FIG. 1) or multiple walls (as described later and shown in FIGS. 3 and 4). A first chamber outlet valve 117 can be coupled to an inlet port 131 of the second chamber 130 to regulate the fluid communication between the first chamber 110 and the second chamber 130 through the chamber divider 102. A chamber connecting passage 150 can be connected between the first and second chambers 110, 130 to selectively equalize the pressure between the two chambers. Accordingly, the chamber connecting passage 150 can include a connecting passage valve 151. In a first or open position or state, the connecting passage valve 151 allows the pressures within the first and second chambers 110, 130 to equalize, and in a second or closed position or state, the connecting passage valve 151 isolates the two chambers from each other, thus allowing different pressures to develop in each chamber. The second chamber 130 can also include a float switch 135 or other liquid quantity detector having wiring 136 or other communication features that, among other functions, allows the float switch 135 to communicate with (e.g., control) the connecting passage valve 151. The float switch 135 can be tripped or activated when the fluid level within the second chamber 130 exceeds a pre-determined value. The second chamber 130 can further include an ambient/pressure port 132 (e.g., a pressure inlet port) and an ambient/pressure valve 152 (or other liquid outlet valve) that regulates fluid communication between the second chamber 130 and the ambient environment or a pressure source. The ambient/pressure valve 152 can operate in conjunction with but out of phase with the connecting passage valve 151, as will be described further below.

The first chamber outlet valve 117 and the second chamber outlet valve 134 are each configured to operate as a check valve. Accordingly, the first chamber outlet valve 117 is open when the pressure in the first chamber 110 is equal to or exceeds the pressure in the second chamber 130. The second chamber outlet valve 134 is open when the pressure within the second chamber 130 is equal to or exceeds the pressure outside the vessel 101.

In a typical operation, the user activates the vacuum source 160 to draw a vacuum on the first chamber 110 via the vacuum line 162. The user opens the connecting passage valve 151 (if it is not automatically opened already) so as to equalize the pressures in the first chamber 110 and the second chamber 130. The user closes the ambient/pressure valve 152 (if it is not automatically closed already). The user then operates the floor tool 180 to remove pre-existing water and/or debris, and/or waste water and debris resulting from cleaning the surface 190. The vacuum in the first chamber 110 draws the waste stream through the waste intake port 111 via the waste water line 181. As water accumulates in the first chamber 110, it passes through the first chamber outlet valve 117 into the second chamber 130 under the force of gravity. The vacuum in the second chamber 130 prevents the water accumulating in the second chamber 130 from passing out of the second chamber 130 via the second chamber outlet valve 134 and into a drain line, large storage tank, and/or other disposal facility (not shown in FIG. 1).

Waste water accumulates in the second chamber 130 until the rising water trips or activates the float switch 135. When the float switch 135 is tripped or activated, it closes the connecting passage valve 151 to allow different pressures to develop in the first chamber 110 and the second chamber 130, and opens the ambient/pressure valve 152. Accordingly, with the connecting passage valve 151 closed, the vacuum source 160 can continue to draw a vacuum on the first chamber 110 without affecting the pressure in the second chamber 130. As a result, the user can continue to operate the floor tool 180 and provide waste water to the first chamber 110 while the second chamber 130 drains.

In a particular embodiment, exposing the second chamber 130 to ambient pressure via the ambient/pressure port 132 is sufficient to remove the waste water accumulated in the second chamber 130. In other embodiments, the ambient/pressure port 132 can be coupled to a source of air at an elevated pressure to expedite the process of removing the waste water from the second chamber 130. In a further particular aspect of this embodiment, the ambient/pressure port 132 is coupled to a blower or pressure outlet 163 of the vacuum source 160 with a blower line 164. Accordingly, the vacuum source 160 can provide two functions: (1) drawing a vacuum on the first chamber 110 and (2) pressurizing the second chamber 130 with the air withdrawn from the first chamber 110.

Once the waste water level in the second chamber 130 has fallen to a preselected level, the float switch 135 de-activates or otherwise changes state, causing the connecting passage valve 151 to open and the ambient/pressure valve 152 to close. Accordingly, the chamber connecting passage 150 once again equalizes the pressures in the first and second chambers 110, 130. The foregoing process continues on a cyclic basis, as needed, without interrupting the user's operation of the floor tool 180.

The foregoing operations can be executed by a controller 103 that receives inputs 104 and issues commands 105. Accordingly, the controller can include analog and/or digital features and/or instructions for carrying out the foregoing tasks. The instructions can take the form of computer-executable instructions carried bt a suitable computer-readable medium.

The system 100 can include other features in addition to those described above. For example, the system can include one or more additional liquid quantity detectors. In particular embodiments, a representative liquid quantity detector includes a shut-off valve 115 (e.g., a float valve) located in the first chamber 110 and coupled to a controller or other control device with wiring 116. The shut-off valve 115 can shut off power to the system 100 or a portion of the system 100 if the water level within the first chamber 110 exceeds a pre-determined level or threshold. The second chamber 130 can include an access port 138 having a removable access hatch 137. The access hatch 137 can be used to install the first chamber outlet valve 117 and/or clean the second chamber 130. A lid 113 positioned at (e.g., over) the first chamber 110 can allow access to the first chamber 110, e.g., for service or cleaning.

Figure 2:
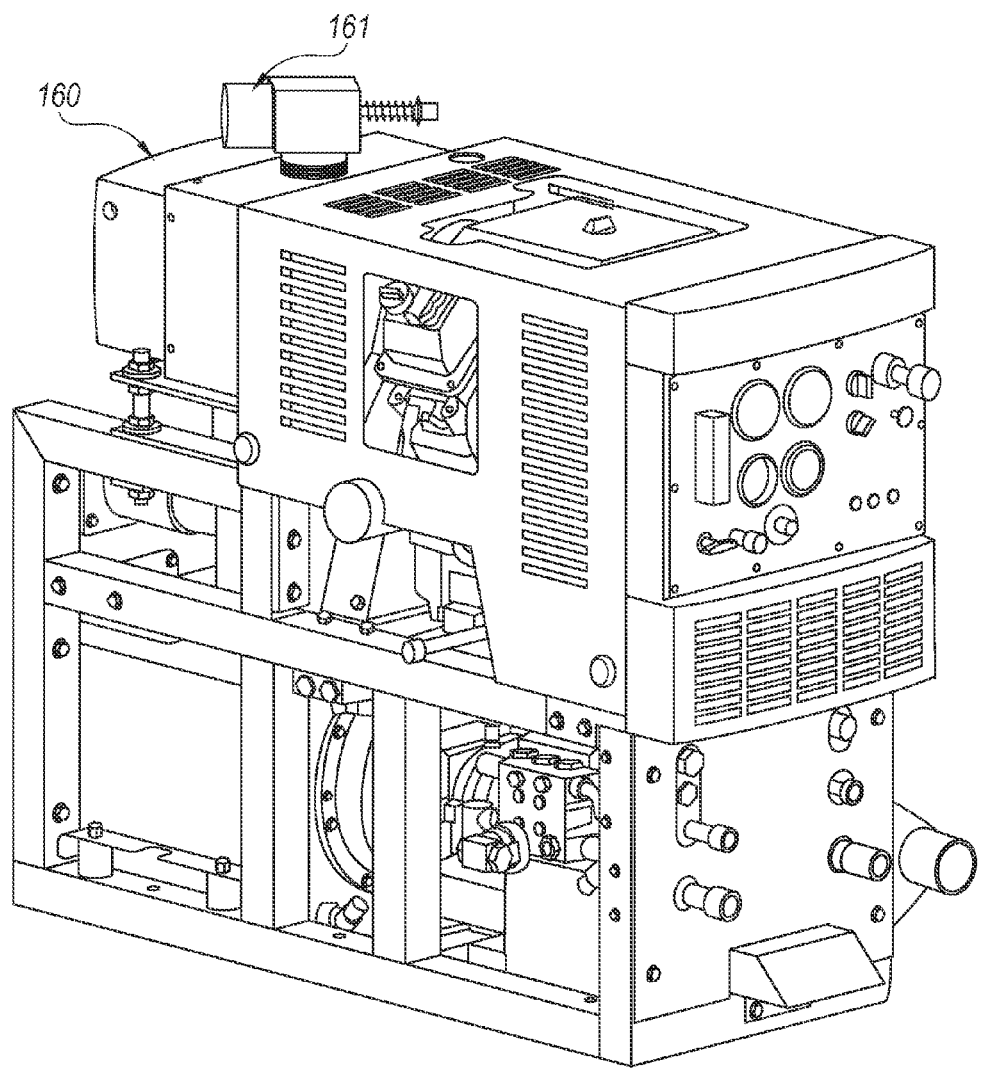
FIG. 2 is an isometric illustration of a representative vacuum source configured in accordance with an embodiment of the present technology.

FIG. 2 is a partially schematic isometric illustration of a representative vacuum source 160, illustrating the vacuum inlet 161. In this embodiment, the same device provides both vacuum for the first chamber 110 described above with reference to FIG. 1, and pressure for the second chamber 130, also described above with reference to FIG. 1, though the blower outlet 163 (FIG. 1) is not visible in FIG. 2. In other embodiments, these functions can be provided by separate devices.

Figure 3:
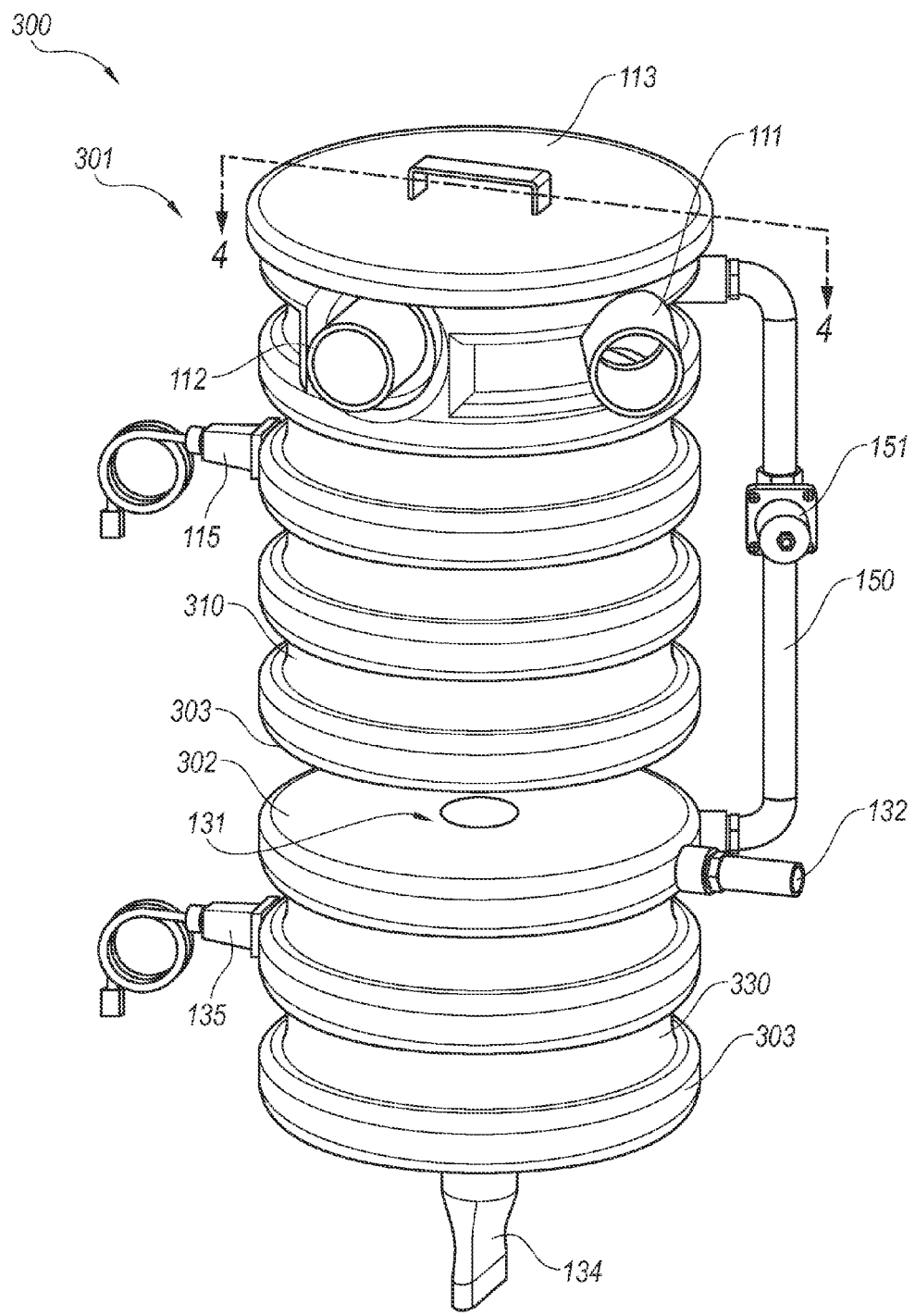
FIG. 3 is a partially schematic illustration of portions of a system for handling waste water in accordance with an embodiment of the present technology.

FIG. 3 is a partially schematic illustration of portions of a system 300 that include several features identical or similar to those described above with reference to FIG. 1, and manufactured in accordance with a particular embodiment of the present technology. In one aspect of this embodiment, the system 300 includes a rotomolded vessel 301 formed from a plastic or other moldable material. The vessel 301 can accordingly include a rotomolded first chamber 310 and second chamber 330. In a particular embodiment, both chambers 310, 330 can be simultaneously formed as a monolithic structure and in other embodiments, each chamber can be individually formed. The vessel 301 can also include a chamber divider 302. The chamber divider 302 can have an upwardly bowed shape to withstand the higher pressure typically produced within the second chamber 330. Each of the first and second chambers 310, 330 can have ribs 303 or other elements that strengthen or reinforce the vessel 301. In other embodiments, the vessel 301 can be formed from other materials and/or with other techniques. For example, the vessel 301 can be formed from sheet metal. In at least some cases, the walls of the vessel 301 can be thick enough not to require the ribs 303.

Figure 4:
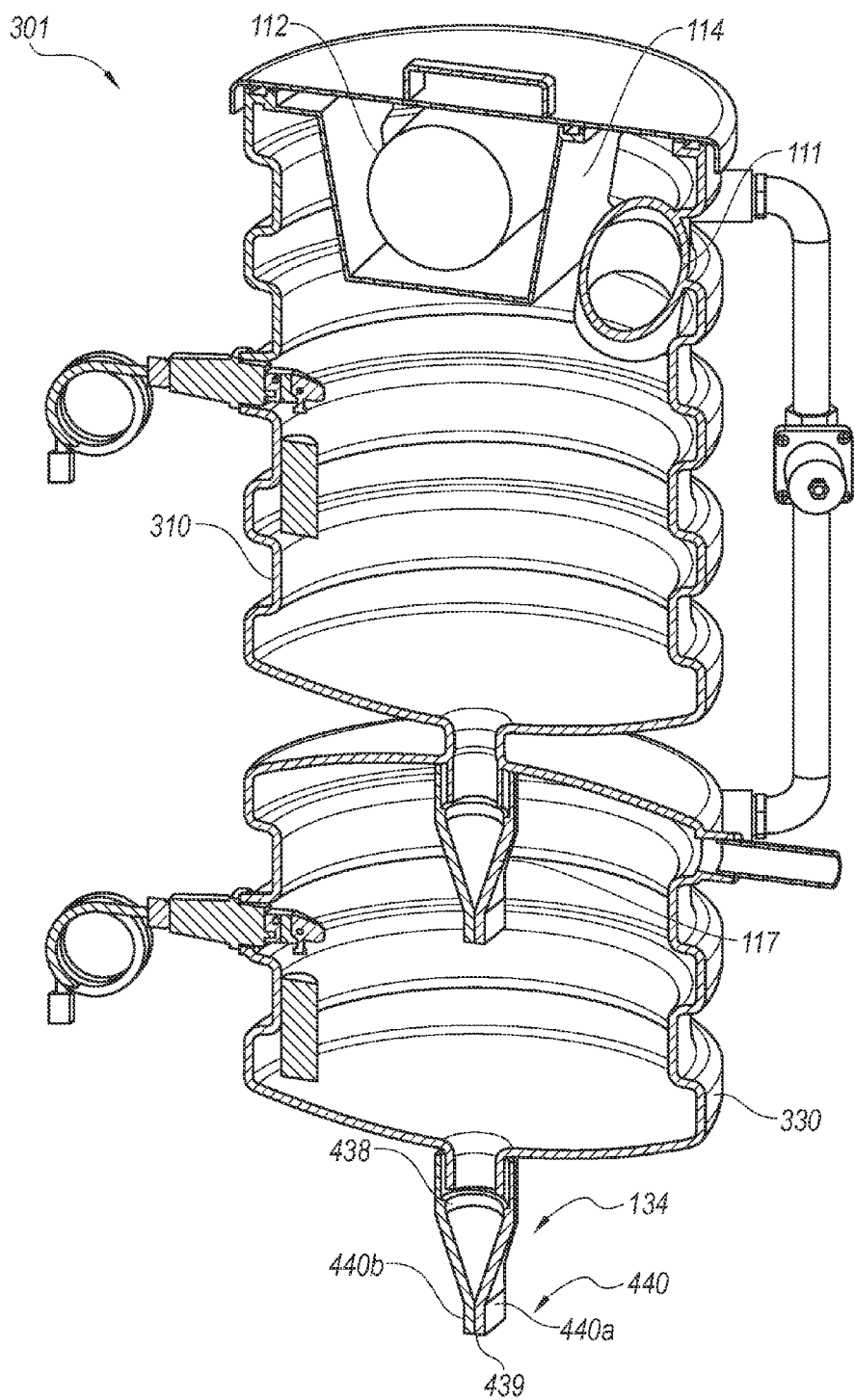
FIG. 4 is a partially schematic, cross-sectional illustration of particular features of an embodiment of the system shown in FIG. 3.

FIG. 4 is a partially schematic, cross-sectional illustration of an embodiment of the vessel 301 shown in FIG. 3. FIG. 4 illustrates further details of the baffle 114, which is arranged to prevent or at least restrict liquid entering the waste intake port 111 from being immediately sucked into the vacuum outlet 112. FIG. 4 also illustrates a representative orientation of the waste intake port 111, illustrating that it is pointing downwardly (e.g., away from the vacuum outlet port 112) and generally tangential to the inner surface of the first chamber 310, so as to allow wastewater to swirl as it descends through the first chamber 310. This swirling action can facilitate separating air entrained in the waste liquid from the waste liquid itself.

FIG. 4 also illustrates further details of the second chamber outlet valve 134. In at least some embodiments, the first chamber outlet valve 117 can include similar features. These features can include, for example, a valve entry 438 (e.g., toward an upper end of the valve 134) and a valve exit 439 (e.g., toward a lower end of the valve 134). At least a portion of the second chamber outlet valve 134 can be formed from a flexible material, which in turn defines, at least in part, flexible flaps 440, illustrated as a first flexible flap 440a and a second flexible flap 440b. The flexible flaps 440 can be configured to close (e.g., in the manner of a duck's bill) when the pressure at the valve entry 438 is less than the pressure at the valve exit 439. The flexible flaps 440 can open when the pressure at the valve entry 438 is greater than the pressure at the valve exit 439. The size and shape of the second chamber outlet valve 134 and the flexible flaps 440 can be configured to allow particulate matter to pass through the valve 134, as desired. The elevated pressure in the second chamber 130 can operate to remove debris that might otherwise be caught between the surfaces (e.g., the flaps 440) of the second chamber valve 134. The materials and material thickness of both the first and second chamber outlet valves 117, 134 can be configured to allow the valves to close readily under preselected pressure differentials. Accordingly, either or both of the chamber outlet valves can have a duck bill configuration with opposing flexible surfaces that are in surface-to-surface contact when the valve is in the closed state and are spaced apart from each other when the valve is in the open state The swirling action of the water in the first chamber 110 (described above) can operate to remove debris that might otherwise be caught between the surfaces (e.g., the flaps 440) of the first chamber valve 117.

One feature of at least some of the foregoing embodiments described above with reference to FIGS. 1-4 is that the systems can allow waste liquid to be withdrawn from the collection vessel at the same time the vessel is collecting waste liquid. This in turn can allow the operator to simultaneously drain fluid from the tank and continue filling the tank, increasing the efficiency with which waste water is removed and handled. Another feature of at least some of the foregoing embodiments is that the foregoing operation can be conducted independently of any direct interaction or intervention by the operator, except to activate the system. For example, the float switch 135 can automatically activate the chamber connecting valve 151 when the fluid level in the second chamber 130 exceeds a pre-determined limit, and can automatically close the chamber connecting valve 151 when the fluid drains from the second chamber 130. Accordingly, the system can include a controller or controller logic carried by the valves and/or by a suitable controller. Still another feature of at least some the foregoing embodiments is that the system can be manufactured at a relatively low cost. In particular, the system can cost less than a pump, which is typically used to evacuate water from a storage tank. In addition, the system can further reduce the cost of operation by increasing the efficiency of the fluid removal process, as described above. Yet another feature of at least some of the foregoing embodiments is that they can eliminate the need for alternating between applying a vacuum source to a collection vessel and applying a pressure source to the collection vessel. Accordingly, the vacuum source can remain coupled to the vacuum outlet port and the pressure source can remain coupled to the second chamber, with the connecting valve, the first chamber valve and/or the second chamber valve being in either the open state or the closed state The methods disclosed herein include and encompass, in addition to methods of making and using the disclosed devices and systems, methods of instructing others to make and use the disclosed devices and systems. For example, a method in accordance with a particular embodiment includes drawing or instructing drawing of waste water into a first chamber under vacuum while the first chamber and a second chamber have at least approximately the same internal pressure, allowing the waste water to pass from the first chamber to the second chamber while the first chamber has an internal pressure equal to or above an internal pressure in a second chamber, releasably sealing the first chamber from fluid communication with the second chamber, and while the first chamber is sealed from fluid communication with the second chamber, simultaneously adding waste water to the first chamber and removing wastewater from the second chamber. A method in accordance with another embodiment includes instructing such a method. Accordingly, any and all methods of use and manufacture disclosed herein also fully disclose and enable corresponding methods of instructing such methods of use and manufacture.

From the foregoing, it will be appreciated that specific embodiments of the presently disclosed technology have been described herein for purposes of illustration, but that various modifications may be made without deviating from the technology. For example, the valves described above may have configurations other than those shown in the Figures. The multiple chambers described above can be housed in a single vessel, as shown in FIG. 1, or in multiple vessels in other embodiments. The first and second chambers can be fixed relative to each other in particular embodiments, and movable relative to each other in other embodiments. In at least some cases, the fixed arrangement can make the chambers easier to handle. The first and second chambers can be generally cylindrical and, in particular embodiments, co-axial. In other embodiments, the chambers can have other shapes and/or arrangements. In at least some cases, the cylindrical/co-axial arrangement can make the chambers easier to handle. The second chamber outlet valve 134 can be located at or just outside the second chamber 130, or it can be located more distant from the second chamber 130, e.g., in or at the end of a drain line. Certain aspects of the disclosed technology described in the context of particular embodiments may be combined or eliminated in other embodiments. For example, the chambers may be manufactured using techniques other than rotomolding, and certain features (e.g., the access ports described above) can be eliminated. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the disclosure and associated technology can encompass other embodiments not expressly shown or described herein.

I/We claim:

1. A waste water handling system, comprising:
    a vessel having a first chamber and a second chamber below the first chamber, the first chamber having a waste intake port coupleable to a source of waste fluid, and a vacuum outlet port coupleable to a vacuum source, the second chamber having a pressure port coupleable to at least one of ambient pressure or a pressure source;
    a chamber divider sealably positioned between the first and second chambers;
    a chamber connecting passage connected in fluid communication with the first and second chambers;
    a connecting passage valve positioned in the chamber connecting passage, the connecting passage valve having an open state and a closed state;
    a first chamber valve coupled between the first and second chambers, the first chamber valve being changeable between an open state when a pressure in the first chamber meets or exceeds a pressure in the second chamber, and a closed state when a pressure in the second chamber exceeds a pressure in the first chamber; and
    a second chamber valve coupled to the second chamber, the second chamber valve having an entrance in fluid communication with the second chamber, the second chamber valve further having an exit, the second chamber valve being changeable between an open state when a pressure at the entrance meets or exceeds a pressure at the exit, and a closed state when a pressure at the exit exceeds a pressure at the entrance.

2. The system of claim 1, further comprising:
    a liquid quantity detector positioned to detect a quantity of liquid in the second chamber;
    a liquid outlet valve coupled to the pressure port of the second chamber, the liquid outlet valve having a closed state and an open state; and
    a controller coupled to the liquid quantity detector, the liquid outlet valve, and the connecting valve, the controller being programmed with instructions that, when executed:
        receive an input from the liquid quantity detector corresponding to a liquid level in the second chamber exceeding a threshold value; and
        in response to the input, direct the connecting valve to close and direct the liquid outlet valve to open.

3. A waste water handling system, comprising:
    a first chamber and a second chamber, the first chamber being positioned above the second chamber, the first chamber having a waste intake port coupleable to a source of waste fluid, and a vacuum outlet port coupleable to a vacuum source, the second chamber having a pressure port coupleable to at least one of ambient pressure or a pressure source;
    a connecting valve coupled in fluid communication with the first and second chambers, the connecting valve having an open state and a closed state;
    a first chamber valve coupled between the first and second chambers, the first chamber valve being changeable between an open state when a pressure in the first chamber meets or exceeds a pressure in the second chamber, and a closed state when a pressure in the second chamber exceeds a pressure in the first chamber; and
    a second chamber valve coupled to the second chamber, the second chamber valve having an entrance in fluid communication with the second chamber, the second chamber valve further having an exit, the second chamber valve being changeable between an open state when a pressure at the entrance meets or exceeds a pressure at the exit, and a closed state when a pressure at the exit exceeds a pressure at the entrance.

4. The system of claim 3, further comprising a chamber connecting passage connected in fluid communication with the first and second chambers, and wherein the connecting valve is positioned at least partially in the chamber connecting passage.

5. The system of claim 3, further comprising:
    a liquid quantity detector positioned to detect a quantity of liquid in the second chamber, the liquid quantity detector being operatively coupled to the connecting valve to place the connecting valve in the open state when a first detected quantity of liquid is below a threshold value and place the connecting valve in the closed state when a second detected quantity of liquid is above a threshold value.

6. The system of claim 5, further comprising a controller coupled to the liquid quantity detector and the connecting valve, the controller being programmed with instructions that, when executed:
    receive an input from the liquid quantity detector corresponding to a liquid level in the second chamber exceeding a threshold value; and
    in response to the input, direct the connecting valve to close.

7. The system of claim 5, further comprising:
    a liquid outlet valve coupled to the pressure port of the second chamber, the liquid outlet valve having a closed state and an open state; and a controller coupled to the liquid quantity detector, the liquid outlet valve, and the connecting valve, the controller being programmed with instructions that, when executed:
  receive an input from the liquid quantity detector corresponding to a liquid level in the second chamber exceeding a threshold value; and
  in response to the input, direct the connecting valve to close and direct the liquid outlet valve to open.

8. The system of claim 3, further comprising:
the vacuum source, and wherein the vacuum source is coupled to the vacuum outlet port; and
the pressure source, and wherein the pressure source is coupled to the second chamber, with the second chamber valve positioned between the pressure source and an interior region of the second chamber.

9. The system of claim 3 wherein the vacuum source remains coupled to the vacuum outlet port and the pressure source remains coupled to the second chamber with any of the connecting valve, the first chamber valve or the second chamber valve being in either of the open state or the closed state.

10. The system of claim 3 wherein only a single wall is positioned between the first and second chambers, and wherein the first chamber valve is positioned to regulate fluid communication between the first and second chambers through the single wall.

11. The system of claim 3 wherein at least one of the first and second chamber valves includes a duck bill valve having two flexible portions that are positioned in surface-to-surface contact with each other when the duck bill valve is in the closed state and are spaced apart from each other when the duck bill valve is in the open state.

12. The system of claim 3 wherein each of the first and second chamber valves includes a duck bill valve having two flexible portions that are positioned in surface-to-surface contact with each other when the duck bill valve is in the closed state and are spaced apart from each other when the duck bill valve is in the open state.

13. The system of claim 3, further comprising:
the vacuum source, and wherein the vacuum source is coupled to the vacuum outlet port; and
the pressure source, and wherein the pressure source is coupled to the pressure port of the second chamber, with the second chamber valve positioned between pressure source and an interior region of the second chamber.

14. The system of claim 3, further comprising the vacuum source and wherein the vacuum source has a vacuum inlet port and a pressure outlet port, and wherein the vacuum inlet port of the vacuum source is coupled to the vacuum outlet port of the first chamber, and wherein the pressure outlet port of the vacuum source is coupled to the pressure port of the second chamber.

15. The system of claim 14, further comprising a baffle positioned between the vacuum outlet port and the pressure port.

16. The system of claim 3 wherein the waste intake port has an opening directed generally tangential to an inner wall of the first chamber.

17. The system of claim 3 wherein the first and second chambers are fixed relative to each other.

18. The system of claim 3 wherein at least one of the first and second chambers includes a plurality of circumferentially extending ribs.

19. The system of claim 3 wherein each of the first and second chambers includes an access port.

20. The system of claim 3 wherein the first and second chambers are generally cylindrical and co-axial.

21. A method for handling waste water, comprising:
drawing or instructing drawing of waste water into a first chamber under vacuum while the first chamber and a second chamber have at least approximately the same internal pressure, the first chamber being above the second chamber;
allowing or instructing allowance of the waste water to pass from the first chamber to the second chamber while the first chamber has an internal pressure equal to or above an internal pressure in a second chamber;
releasably sealing or instructing sealing of the first chamber from fluid communication with the second chamber; and
while the first chamber is sealed from fluid communication with the second chamber, simultaneously adding or instructing adding of waste water to the first chamber and removing wastewater from the second chamber.

22. The method of claim 21, further comprising detecting a quantity of liquid in the second chamber, and wherein releasably sealing or instructing sealing is performed in response to detecting the quantity of liquid in the second chamber.

23. The method of claim 22 wherein detecting and releasably sealing or instructing sealing are performed automatically by controller-based instructions.

24. The method of claim 21 wherein removing wastewater from the second chamber includes exposing an interior volume of the second chamber to atmospheric pressure.

25. The method of claim 21 wherein removing wastewater from the second chamber includes exposing an interior volume of the second chamber to a pressure above atmospheric pressure.

26. The method of claim 21 wherein drawing or instructing drawing includes drawing or instructing drawing of the wastewater into the first chamber via a hand-operated floor tool.

27. A waste water handling system, comprising:
a first chamber and a second chamber, the first chamber having a waste intake port coupleable to a source of waste fluid, and a vacuum outlet port coupleable to a vacuum source, the second chamber having a pressure port coupleable to at least one of ambient pressure or a pressure source;
a connecting valve coupled in fluid communication with the first and second chambers, the connecting valve having an open state and a closed state;
a first chamber valve coupled between the first and second chambers, the first chamber valve being changeable between an open state when a pressure in the first chamber meets or exceeds a pressure in the second chamber, and a closed state when a pressure in the second chamber exceeds a pressure in the first chamber;
a second chamber valve coupled to the second chamber, the second chamber valve having an entrance in fluid communication with the second chamber, the second chamber valve further having an exit, the second chamber valve being changeable between an open state when a pressure at the entrance meets or exceeds a pressure at the exit, and a closed state when a pressure at the exit exceeds a pressure at the entrance;
a liquid quantity detector positioned to detect a quantity of liquid in the second chamber, the liquid quantity detector being operatively coupled to the connecting valve to place the connecting valve in the open state when a first detected quantity of liquid is below a threshold value and place the connecting valve in the closed state when a second detected quantity of liquid is above a threshold value;

a liquid outlet valve coupled to the pressure port of the second chamber, the liquid outlet valve having a closed state and an open state; and a controller coupled to the liquid quantity detector, the liquid outlet valve, and the connecting valve, the controller being programmed with instructions that, when executed:

receive an input from the liquid quantity detector corresponding to a liquid level in the second chamber exceeding a threshold value; and in response to the input, direct the connecting valve to close and direct the liquid outlet valve to open.

28. A waste water handling system, comprising:

a first chamber and a second chamber, the first chamber having a waste intake port coupleable to a source of waste fluid, and a vacuum outlet port, the second chamber having a pressure port;

a connecting valve coupled in fluid communication with the first and second chambers, the connecting valve having an open state and a closed state;

a first chamber valve coupled between the first and second chambers, the first chamber valve being changeable between an open state when a pressure in the first chamber meets or exceeds a pressure in the second chamber, and a closed state when a pressure in the second chamber exceeds a pressure in the first chamber;

a second chamber valve coupled to the second chamber, the second chamber valve having an entrance in fluid communication with the second chamber, the second chamber valve further having an exit, the second chamber valve being changeable between an open state when a pressure at the entrance meets or exceeds a pressure at the exit, and a closed state when a pressure at the exit exceeds a pressure at the entrance; and a vacuum source having a vacuum inlet port and a pressure outlet port, and wherein the vacuum inlet port of the vacuum source is coupled to the vacuum outlet port of the first chamber, and wherein the pressure outlet port of the vacuum source is coupled to the pressure port of the second chamber.

29. A method for handling waste water, comprising:

drawing or instructing drawing of waste water into a first chamber under vacuum while the first chamber and a second chamber have at least approximately the same internal pressure;

allowing or instructing allowance of the waste water to pass from the first chamber to the second chamber while the first chamber has an internal pressure equal to or above an internal pressure in a second chamber;

releasably sealing or instructing sealing of the first chamber from fluid communication with the second chamber;

while the first chamber is sealed from fluid communication with the second chamber, simultaneously adding or instructing adding of waste water to the first chamber and removing wastewater from the second chamber; and detecting a quantity of liquid in the second chamber, and wherein releasably sealing or instructing sealing is performed in response to detecting the quantity of liquid in the second chamber, wherein removing wastewater from the second chamber includes exposing an interior volume of the second chamber to a pressure above atmospheric pressure.

* * * * *